US009238526B2

(12) United States Patent
Anzini et al.

(10) Patent No.: US 9,238,526 B2
(45) Date of Patent: Jan. 19, 2016

(54) TEAR STRIP CREATION ON ZIPPER FLANGES

(75) Inventors: David J. Anzini, Middletown, NY (US);
Lars Wihlborg, Stratford, CT (US);
Rusty Koenigkramer, Nanuet, NY (US); Glyn Russell, New City, NY (US);
Eric P. Plourde, Frankfort, IL (US);
David J. Matthews, Gilman, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 488 days.

(21) Appl. No.: 13/193,834

(22) Filed: Jul. 29, 2011

(65) Prior Publication Data

US 2012/0189232 A1 Jul. 26, 2012

Related U.S. Application Data

(60) Provisional application No. 61/368,819, filed on Jul. 29, 2010.

(51) Int. Cl.
| B65D 33/16 | (2006.01) |
| B65D 30/00 | (2006.01) |
| A44B 19/14 | (2006.01) |
| B65D 33/25 | (2006.01) |
| B29C 44/04 | (2006.01) |

(52) U.S. Cl.
CPC ............ *B65D 33/2508* (2013.01); *B29C 44/04* (2013.01); *B65D 33/2533* (2013.01); *Y10T 24/2534* (2015.01)

(58) Field of Classification Search
CPC ........... B65D 33/2508; B65D 33/2533; B29C 44/04; Y10T 24/2534

USPC ............ 383/63, 64, 210, 210.1, 204; 24/399, 24/400
See application file for complete search history.

(56) References Cited

U.S. PATENT DOCUMENTS

| 3,619,395 | A | | 11/1971 | Skendzic |
| 3,625,270 | A | | 12/1971 | Skendzic |
| 4,387,170 | A | * | 6/1983 | Kuhnel et al. ................... 521/85 |
| 4,617,683 | A | | 10/1986 | Christoff |
| 6,709,157 | B2 | * | 3/2004 | VandenHeuvel et al. ..... 383/204 |
| 7,137,736 | B2 | * | 11/2006 | Pawloski et al. .............. 383/61.2 |
| 7,163,338 | B2 | * | 1/2007 | McCracken et al. .......... 383/61.2 |
| 7,241,046 | B2 | * | 7/2007 | Piechocki et al. ............... 383/59 |
| 7,340,807 | B2 | * | 3/2008 | Dais et al. ....................... 24/443 |
| 7,364,361 | B2 | * | 4/2008 | Turvey et al. ................... 383/33 |
| 7,410,298 | B2 | * | 8/2008 | Pawloski ........................ 383/61.2 |
| 7,419,301 | B2 | * | 9/2008 | Schneider et al. ............. 383/209 |

(Continued)

FOREIGN PATENT DOCUMENTS

| EP | 0 405 995 | 1/1991 |
| EP | 2 103 541 | 9/2009 |

(Continued)

*Primary Examiner* — Robert J Sandy
*Assistant Examiner* — Louis Mercado
(74) *Attorney, Agent, or Firm* — McCarter & English, LLP

(57) ABSTRACT

The disclosure pertains to various embodiments of zippers with a tear flange for use in a reclosable flexible package or bag. A line of weakness can be introduced into the tear flange by application of a peel seal polymer resin or of a foaming agent. The disclosure includes further embodiments wherein lines of weakness are introduced into the flange of zippers in reclosable packages or bags.

5 Claims, 5 Drawing Sheets

(56) References Cited

U.S. PATENT DOCUMENTS

| | | |
|---|---|---|
| 8,523,437 B2 * | 9/2013 | Strand et al. .................... 383/64 |
| 2003/0072502 A1 * | 4/2003 | Strand et al. ...................... 383/5 |
| 2004/0136618 A1 * | 7/2004 | Ausnit et al. ................... 383/64 |
| 2006/0120630 A9 * | 6/2006 | Ausnit et al. ................... 383/64 |
| 2007/0258665 A1 | 11/2007 | Greco et al. |
| 2009/0297071 A1 * | 12/2009 | Koenigkramer et al. ....... 383/63 |
| 2010/0278457 A1 * | 11/2010 | Greco et al. .................... 383/64 |
| 2011/0042407 A1 * | 2/2011 | Steele ............................... 222/1 |
| 2011/0293204 A1 * | 12/2011 | Plourde ........................... 383/63 |
| 2012/0301056 A1 * | 11/2012 | Anzini et al. ................. 383/61.2 |

FOREIGN PATENT DOCUMENTS

| | | |
|---|---|---|
| JP | 2004 136980 | 5/2004 |
| JP | 2004 244027 | 9/2004 |

* cited by examiner

TEAR STRIP CREATION ON ZIPPER FLANGES

This application claims priority under 35 U.S.C. §119(e) of U.S. provisional application Ser. No. 61/368,819 filed Jul. 29, 2010, the disclosure of which is hereby incorporated by reference in its entirety.

BACKGROUND OF THE DISCLOSURE

1. Field of the Disclosure

The present disclosure relates to reclosable packages wherein tear strips are provided within the flanges of the reclosable zippers.

2. Description of the Prior Art

Previous designs of easy-opening reclosable packages have typically included tear features such as laser scoring, perforation, tear beads or similar structures formed on the package film or by separate addition of an element. However, this prior art did not provide a tearing feature through direct modification of the zipper flange at the top of the package, particularly those including multiple-track self-locking zippers. Similarly, some previous designs of reclosable packages did not provide a full combination of reduced manufacturing costs, increased hermeticity and reliable ease of opening.

OBJECTS AND SUMMARY OF THE DISCLOSURE

It is therefore an object of the present disclosure to provide a zipper for a reclosable package wherein a tearing capability is formed in the flange of the zipper, typically a multiple-track self-locking zipper.

It is therefore a further object of the present disclosure to provide a zipper for a reclosable package wherein reduced manufacturing costs, increased hermeticity and reliable ease of opening are achieved.

A first embodiment of the disclosure includes applying polymer resin of the type normally used as a peel seal in order to create a tear line on the flanges. When such a zipper is applied to an oriented film and made into a bag, it will enable the bag to be opened by tearing the film and zipper flange in a straight line.

A second embodiment of the disclosure includes providing a foaming agent to achieve a density reduction in a portion of the flange. The action of drawing down the zipper flange orients the polymer and the entrained gas bubbles, which causes the flange material to tear in a linear fashion.

A third embodiment of the disclosure includes providing a zipper wherein the consumer side flange includes a coextrusion of peel seal resin, and wherein the web is perforated across its entire width before the zipper is attached. The consumer side flange includes a secondary flange that is sealed to the zipper flange via formation of the pre-activated peel seal. Further, the secondary flange lies over the perforation.

A fourth embodiment of the disclosure includes a package wherein the web is perforated across its entire width before the zipper is attached. The upper flange of the zipper lies over the perforation and an upper seal joins the flange to the film in the area that will be above the perforation in the finished package. A lower seal joined to the flange below the perforation, thereby completely sealing over the perforation and encapsulating it.

BRIEF DESCRIPTION OF THE DRAWINGS

Further objects and advantages of the invention will become apparent from the following description and from the accompanying drawing, wherein.

DETAILED DESCRIPTION OF THE PREFERRED EMBODIMENTS

Figure 1:
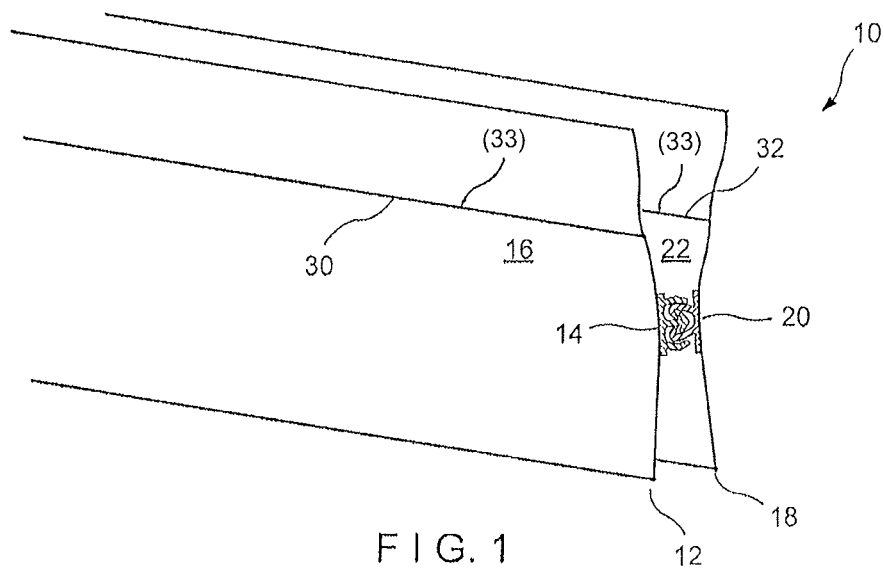
FIG. 1 is a plan view of a reclosable zipper of the first or second embodiment of the present disclosure.
Figure 2:
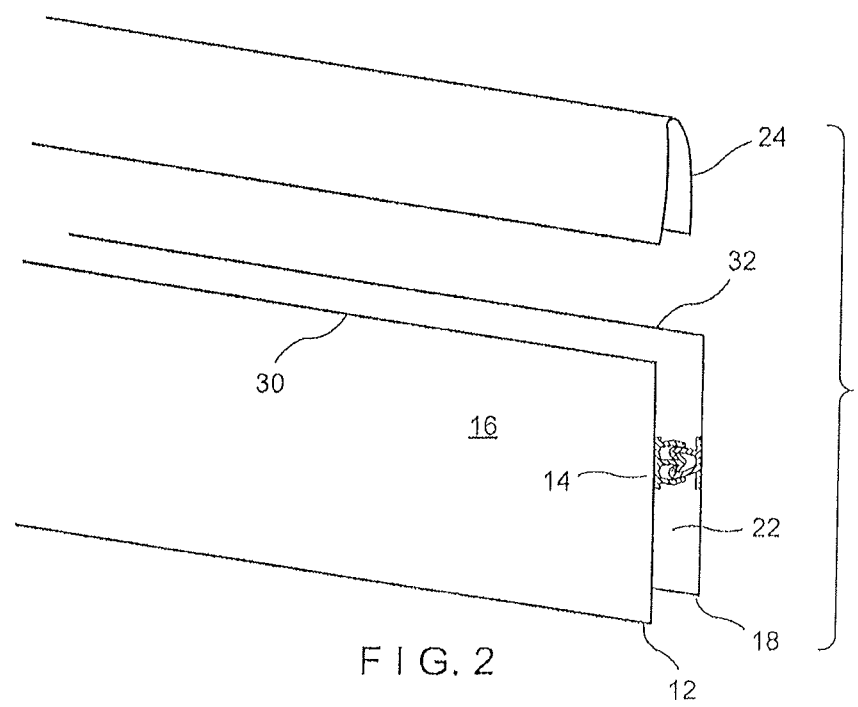
FIG. 2 is a plan view of reclosable zipper of the first or second embodiment of the present disclosure, after the line of weakness has been torn.

Referring now to the drawings in detail wherein like numerals indicate like elements throughout the several views, one can see that the first and second embodiments of the present disclosure can be illustrated by FIGS. 1 and 2.

FIG. 1 illustrates a zipper 10 for a reclosable package, typically made from polymeric material. Zipper 10 includes first zipper profile 12 with a first interlocking element 14 and a first flange 16 extending upwardly and downwardly therefrom. Zipper 10 further includes second zipper profile 18 with a second interlocking element 20 and a second flange 22 extending upwardly and downwardly therefrom. As is known in the prior art, when first and second interlocking elements 14, 20 are interlocked with each other, the mouth of the reclosable package is closed. When first and second interlocking elements 14, 20 are separated from each other, the mouth of the reclosable package is open. In some embodiments, first and second zipper profiles 12, 18 are separate segments. In other embodiments, first and second zipper profiles 12, 18 are formed from segments of a single self-mating zipper, which can be folded so as to mate with itself.

First line of weakness 30 is formed longitudinally across first flange 16, above and parallel to the first interlocking element 14. Likewise, second line of weakness 32 is formed longitudinally across second flange 22, above and parallel to the second interlocking element 20. Typically, the lower portions first and second flanges 16, 22 are joined to the walls of the package (not shown) along a seal line below the first and second lines of weakness 30, 32 while the upper portions of first and second flanges 16, 20 are sealed together to form removable header 24 (see FIG. 2). In this way, the resulting package or bag can be opened by tearing the film of the bag wall and the zipper flanges (along first and second lines of weakness 30, 32) in a straight line, thereby resulting in the removal of the header 24 with access to the first and second interlocking elements 14, 20 as shown in FIG. 2. The benefit of tearing both substrates instead of only a bag wall film is a more robust opening experience.

In the first embodiment of the present disclosure, polymer resin which is typically used as a peel seal is applied to, or co-extruded with, first and second flanges 16, 22 in order to form the first and second lines of weakness 30, 32. The peel seal resin is typically coextruded as a discrete layer on the first and second zipper flanges 16, 22. This results in the orientation of the material in the first and second flanges 16, 22 making it behave as oriented film. The peel seal layer can be added to, or co-extruded with, one or both sides of first and second flanges 16, 22. However, the layer is typically applied to, or co-extruded with, both first and second flanges 16, 22, particularly if the flanges are of equal length. It has been found that DuPont Appeel resin is particularly well adapted to this embodiment. Peel seal materials are typically polymers or polymer blends that fail cohesively. The added thickness in the header of the package gives a more positive feel when tearing off the header. Furthermore, the elimination of perforations and laser scoring to form the lines of weakness typically results in a more hermetic, easier-to-open package.

In the second embodiment of the present disclosure, a foaming agent is applied via coextrusion to first and second flanges 16, 22 in order to form the first and second lines of weakness 30, 32. The foaming agent forms the first and second lines of weakness 30, 32 by controlled density reduction (typically approximately a twenty percent reduction, when compared to the portions of the first and second flanges 16, 22 not treated with the foaming agent). The action of drawing down the first and second zipper flanges 16, 22 by the foaming agent orients the polymer of the flanges and the entrained gas bubbles, which causes the first and second flanges 16, 22 to tear in a linear fashion along first and second lines of weakness 30, 32.

Figure 4:
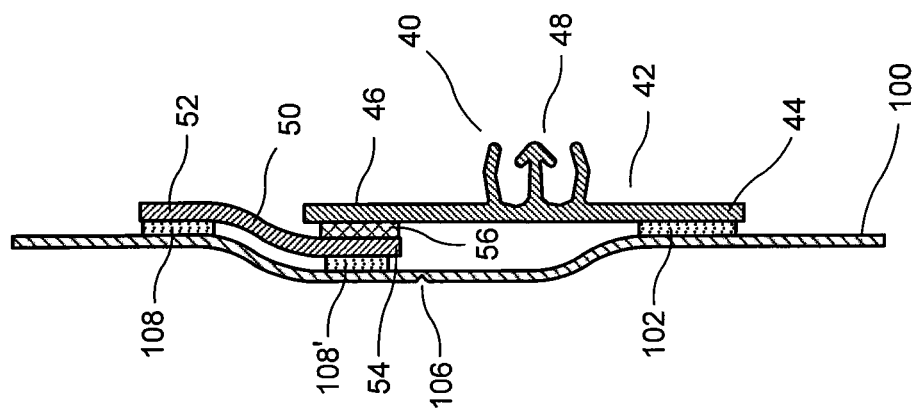
FIG. 4 is a cross-sectional view of a second zipper of the third embodiment of the present disclosure.
Figure 3:
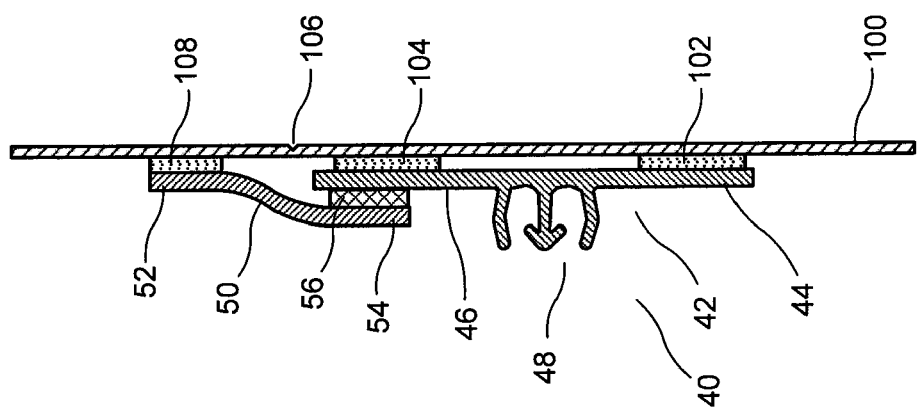
FIG. 3 is a cross-sectional view of a first zipper of the third embodiment of the present disclosure.

A third embodiment of the present disclosure is illustrated in FIGS. 3 and 4. In FIG. 3, a zipper profile 40 (typically multiple-track self-mating) is illustrated, including a base 42 which forms product side flange 44 and consumer side flange 46. Interlocking element 48, typically a multiple-track self-mating interlocking element, is formed on base 42. The product side flange 44 is sealed or otherwise connected to package wall 100 at seal (or attachment area) 102 while the consumer side flange 46 is sealed or otherwise connected to package wall 100 at seal (or attachment area) 104. Alternatively, the entire base 42 can be sealed or otherwise connected to package wall 100. A line of weakness 106 (such as, but not limited to a perforated line, a laser scored line, or the lines of weakness as disclosed in the first and second embodiments above) is formed in package 100 on the consumer side of zipper profile 40. Secondary flange 50 has a first end 52 and a second end 54. First end 52 is sealed or attached to package wall 100 by a hard seal (or attachment area) 108, while second end 54 is sealed to consumer side flange 46 by peel seal 56, which is typically formed by a coextrusion of peel seal resin. The resulting zipper 40 is sealed to the package film, typically in a transverse direction, across the entire width of the package wall 100. The line of weakness 106 may be formed in the package wall 100 after the zipper 40 has been sealed or attached to the package wall 100.

FIG. 4 is a variation of FIG. 3. First and second ends 52, 54 of secondary flange 50 are sealed to the package wall 100 at seals 108, 108'. Product side flange 44 is sealed to the package wall 100 at seal 102. Consumer side flange 46 is attached to second end 54 of secondary flange 50 by peel seal 56 and line of weakness 106 is formed in package wall 100 immediately below the level of peel seal 56.

Figure 5:
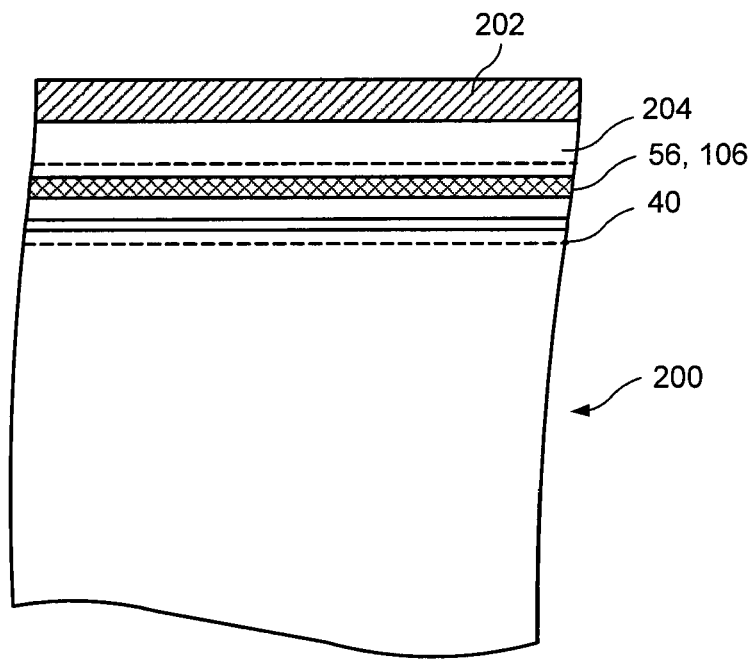
FIG. 5 is a plan view of a package utilizing a zipper of the third embodiment of the present disclosure.

FIG. 5 illustrates a typical finished package 200 using the zipper 40 of either FIG. 3 or 4. Typically, this finished package 200 may be formed by a vertical form fill seal process with the film wrapped around to form a rear fin seal (not shown). The zipper 40 with the pre-activated peel seal 56 would cover the entire circumference of the package 200, other than the fin seal. The top of the package is sealed with a full header seal 202, making the package 200 hermetic.

Figure 6:
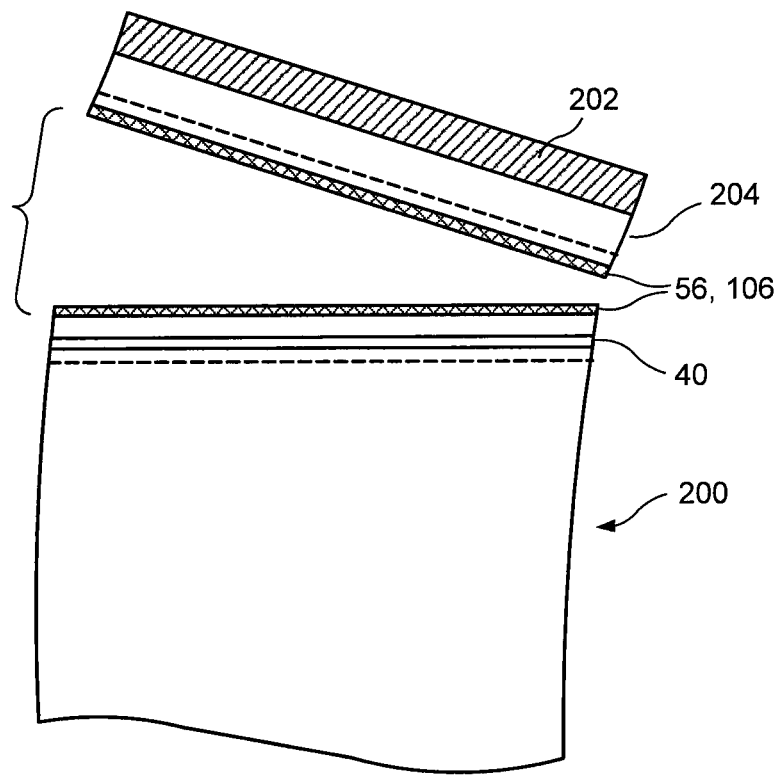
FIG. 6 is a plan view of a package utilizing a zipper of the third embodiment of the present disclosure, showing the top of the package removed.

As seen in FIG. 6, the package 200 is opened by breaking the line of weakness 106 and opening the peel seal 56 around the entire circumference of the package 200, thereby allowing the user to tear the whole top assembly 204 from the package 200. This will leave the zipper profile 40 (which is typically multiple-track self-mating) at the top of the resulting package 200 (not including the top assembly 204), thereby providing a wide mouth opening with reclosure. When the zipper 40 of FIG. 3 is used in the package 200 of FIGS. 5 and 6, the user pulls at the peel seal 56 outwardly and downwardly to open the package 200. When the zipper of FIG. 4 is used in the package 200 of FIGS. 5 and 6, the top of the package 200 can be peeled open with an upward motion.

Figure 7:
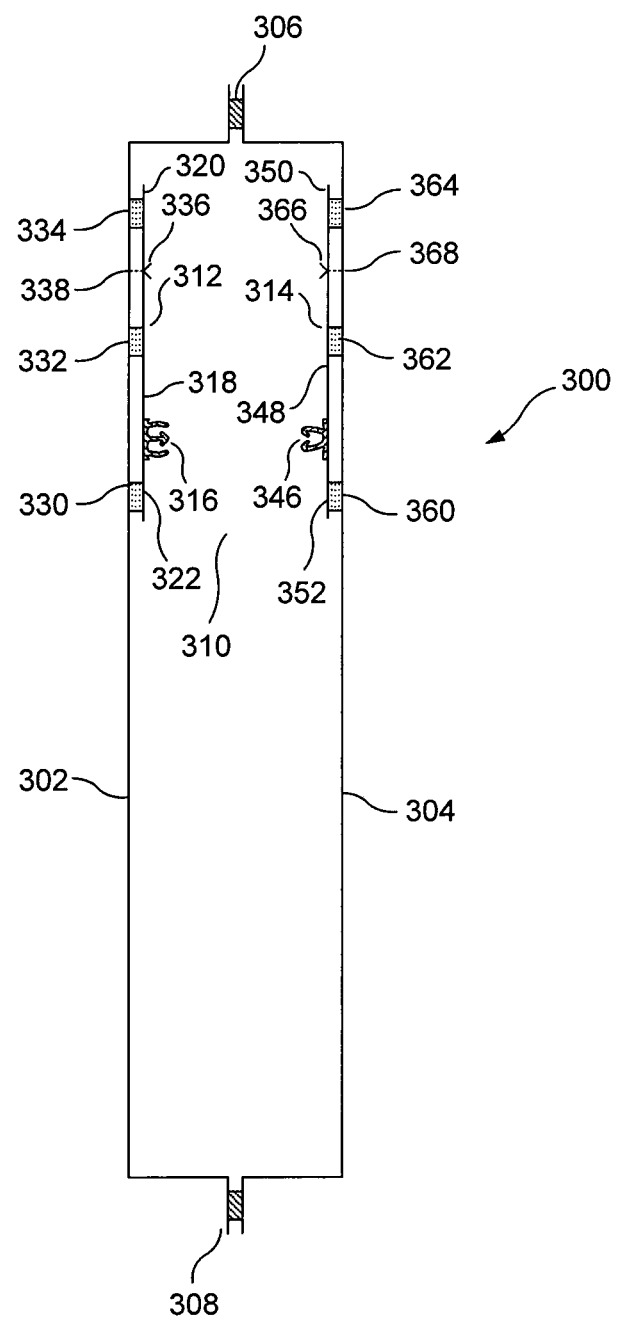
FIG. 7 is a cross-sectional view of a package using a zipper of the fourth embodiment of the present disclosure.

FIG. 7 discloses a cross-section of a package 300 with first and second package walls 302, 304 which are sealed together at a top edge thereof by top seal 306 and a bottom edge thereof by bottom seal 308. Zipper 310 is typically a self-mating zipper in that it can be folded back onto itself to interlock to create a closure. For purposes of illustration, FIG. 7 will be described as includes first and second profiles 312, 314 and similar first and second elements. However, typically, these first and second elements form part of a continuous element which extends around the inside of the mouth of the finished package. First profile 312 includes first interlocking element 316 and first base 318. First base 318 forms first consumer side flange 320 on the consumer side of first interlocking element 316 and first product side flange 322 on the product side of first interlocking element 316. First consumer side flange 320 is typically longer than first product side flange 322. First seal 330 is formed between the first product side flange 322 and first package wall 302. Second seal 332 is formed between the first consumer side flange 320 and the first package wall 302, immediately adjacent to the first interlocking element 316 (i.e., at the proximal end of first consumer side flange 320). Third seal 334 is formed between the distal end of first consumer side flange 320 and first package wall 302. First flange line of weakness 336 is formed in first consumer side flange 320 between second and third seals 332, 334. First package wall line of weakness 338 is formed in first package wall 302 so as to be aligned with first flange line of weakness 336. Lines of weakness 336, 338 may be formed by laser scoring, perforations, thinning, or other methods, including those disclosed in the first and second embodiments above.

Similarly, second profile 314 includes second interlocking element 346 and second base 348. Second base 348 forms second consumer side flange 350 on the consumer side of second interlocking element 346 and second product side flange 352 on the product side of second interlocking element 346. Second consumer side flange 350 is typically longer than second product side flange 352. Fourth seal 360 is formed between the second product side flange 352 and second package wall 304. Fifth seal 362 is formed between the second consumer side flange 350 and the second package wall 304, immediately adjacent to the second interlocking element 346 (i.e., at the proximal end of second consumer side flange 350). Sixth seal 364 is formed between the distal end of second consumer side flange 350 and second package wall 304. Second flange line of weakness 366 is formed in second consumer side flange 350 between fifth and sixth seals 362, 364. Second package wall line of weakness 368 is formed in second package wall 304 so as to be aligned with second flange line of weakness 366. Lines of weakness 366, 368 may be formed by laser scoring, perforations, thinning, or other methods, including those disclosed in the second and second embodiments above. In the preferred case of a self-mating zipper, second profile 314 is a continuation of first profile 312. Similarly, the zipper components, seals and lines of weaknesses may be continuations of each other with respect to the two zipper profiles. In other words, first and profiles 312, 314 may be separate segments of zipper profile, or may be segments of the same length of self-mating zipper.

Figure 8:
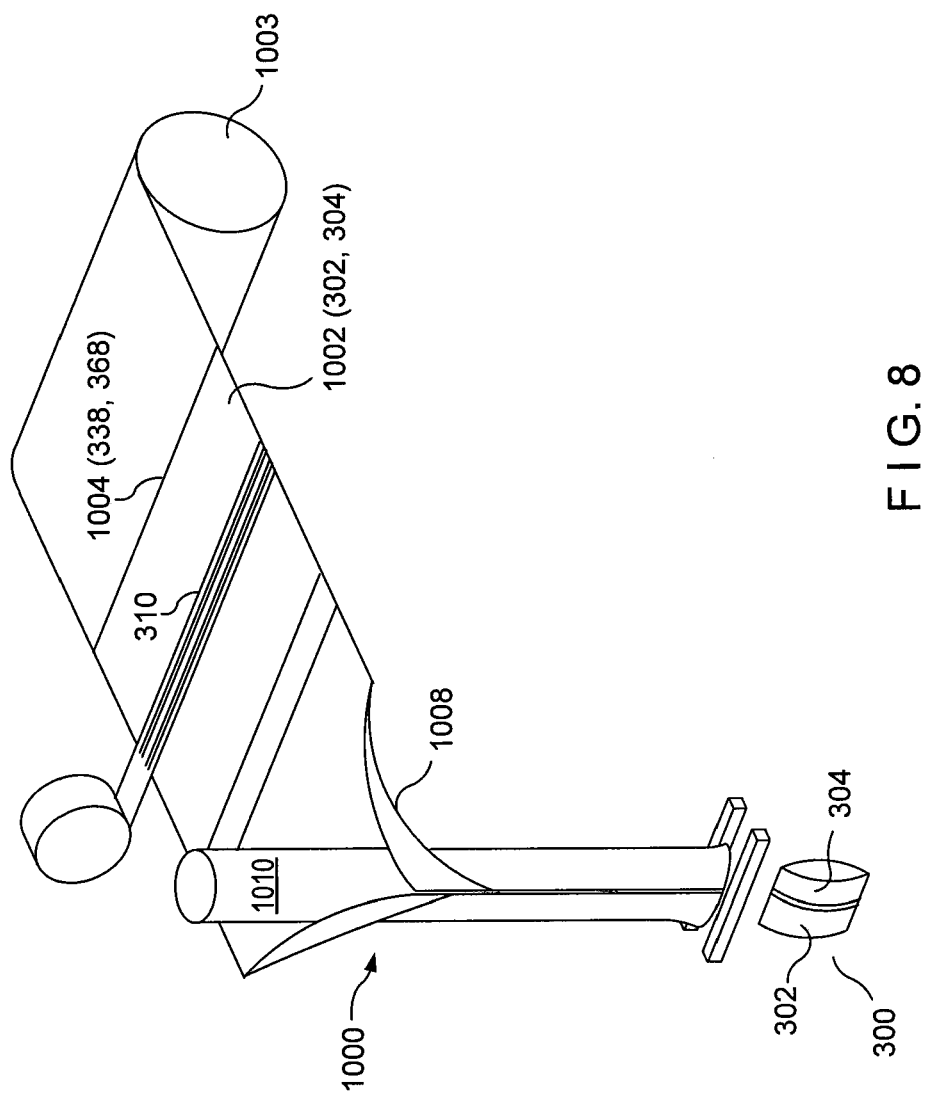
FIG. 8 is a plan view of a form fill seal device employing the zipper of the fourth embodiment of the present disclosure.

FIG. 8 illustrates a form fill seal apparatus 1000 wherein film or web 1002 is provided from a spool 1003 to form first and second package walls 302, 304 of resulting package 300. The film or web 1002 is perforated transversely along line of weakness 1004 in order to form first and second package wall lines of weakness 338, 368 (the subsequent folding of film or web 1002 by forming collar 1008 forms the first and second package walls 302, 304 from film 1002, thereby similarly forming first and second package wall lines of weakness 338, 368). Zipper 310 of FIG. 7 is attached transversely to film or web 1002 so that first and second consumer side flanges 320, 350 lie over the line of weakness 1004 and third and sixth seals 334, 364 are formed. The remaining seals of FIG. 7 are formed thereby completely closing over the line of weakness 1004 and encapsulating it. There is typically no need for additional closing of the zipper 310 to the film or web 1002, or package 300, downstream of the fill tube 1010 of form fill seal apparatus 1000. For the package 300 to tear properly, the flange 320, 350 must have linear tear properties along first and second flange lines of weakness 336, 366. This linear tearing can be achieved by perforations, laser scoring, thinning or other methods including those of the first and second embodiments above. Additionally, multiple flange tear lines may be introduced to increase reliability.

Thus the several aforementioned objects and advantages are most effectively attained. Although preferred embodiments of the invention have been disclosed and described in detail herein, it should be understood that this invention is in no sense limited thereby and its scope is to be determined by that of the appended claims.

What is claimed is:

1. A zipper for a reclosable package, including:
   a first zipper profile segment with a first interlocking element and a first flange;
   a second zipper profile segment with a second interlocking element and a second flange;
   the first flange including a first line of weakness of controlled density reduction formed in response to co-extrusion of a foaming agent in the first flange, wherein the first line of weakness permits tearing of the first flange; and
   wherein the second flange includes a second line of weakness of controlled density reduction formed in response to co-extrusion of a foaming agent in the second flange, wherein the second line of weakness permits tearing of the second flange.

2. The zipper of claim 1 wherein the first and second lines of weakness are formed parallel to the first and second interlocking elements.

3. The zipper of claim 1 wherein the foaming agent causes a twenty percent density reduction in the first line of weakness and the second line of weakness with respect to remaining portions of the first and second flanges.

4. The zipper of claim 1 wherein the first and second zipper profile segments are both formed from a single self-mating zipper.

5. The zipper of claim 1 wherein the first and second zipper profile segments are separate from each other.

* * * * *